(12) United States Patent
Ophir et al.

(10) Patent No.: US 7,283,554 B2
(45) Date of Patent: Oct. 16, 2007

(54) NETWORK MANAGER FOR A HYBRID NETWORK ENVIRONMENT

(75) Inventors: Lior Ophir, Herzlia (IL); Liran Brecher, Kfar-Saba (IL)

(73) Assignee: Texas Instruments Incorporated, Dallas, TX (US)

(*) Notice: Subject to any disclaimer, the term of this patent is extended or adjusted under 35 U.S.C. 154(b) by 1026 days.

(21) Appl. No.: 10/074,571

(22) Filed: Feb. 12, 2002

(65) Prior Publication Data

US 2002/0110142 A1 Aug. 15, 2002

Related U.S. Application Data

(60) Provisional application No. 60/268,332, filed on Feb. 12, 2001.

(51) Int. Cl.
*H04L 12/417* (2006.01)

(52) U.S. Cl. .................. 370/447; 370/461; 370/462

(58) Field of Classification Search ............ 370/348, 370/400, 401, 419, 420, 447, 461–463; 709/223–226, 709/229
See application file for complete search history.

(56) References Cited

U.S. PATENT DOCUMENTS

| | | |
|---|---|---|
| 4,161,786 A | 7/1979 | Hopkins et al. |
| 5,081,649 A | 1/1992 | Kennard |
| 5,127,090 A | 6/1992 | Ruehle et al. |
| 5,276,703 A | 1/1994 | Budin et al. |
| 5,351,272 A | 9/1994 | Abraham |
| 5,363,408 A | 11/1994 | Paik et al. |
| 5,539,744 A | 7/1996 | Chu et al. |
| 5,673,290 A | 9/1997 | Cioffi |
| 5,883,907 A | 3/1999 | Hoekstra |
| 5,889,861 A | 3/1999 | Ohashi et al. |
| 5,892,766 A | 4/1999 | Wicki et al. |
| 5,896,443 A | 4/1999 | Dichter |
| 5,917,809 A | 6/1999 | Ribner et al. |
| 5,973,609 A | 10/1999 | Schoch |
| 5,983,101 A | 11/1999 | Billstrom |
| 6,754,176 B1 * | 6/2004 | Gubbi et al. ................ 370/230 |
| 6,850,981 B1 * | 2/2005 | Ho et al. .................... 709/227 |
| 6,934,752 B1 * | 8/2005 | Gubbi ....................... 709/225 |
| 2002/0071448 A1 * | 6/2002 | Cervello et al. ............ 370/445 |
| 2002/0071449 A1 * | 6/2002 | Ho et al. .................... 370/447 |
| 2002/0163933 A1 * | 11/2002 | Benveniste ................. 370/465 |

\* cited by examiner

*Primary Examiner*—Wing Chan
*Assistant Examiner*—Duc Duong
(74) *Attorney, Agent, or Firm*—Steven A. Shaw; W. James Brady; Frederick J. Telecky, Jr.

(57) ABSTRACT

A system, apparatus and method are disclosed for implementing a managed network in a hybrid network environment to support nodes having managed network capability together with nodes that do not support managed network capabilities. In one form of the invention, a method for managing data communication on a network coupled to first nodes and second nodes is provided comprising: controlling a first time period for one or more first data transmissions on the network wherein the first nodes are permitted to transmit data during the first time periods and the second nodes are not permitted to transmit data during the first time period by causing the second nodes to treat the first time period as a single transmission period. Other methods, apparatus and systems are provided.

8 Claims, 1 Drawing Sheet

NETWORK MANAGER FOR A HYBRID NETWORK ENVIRONMENT

This application claims priority from the Provisional Patent Application Ser. No.: 60/268,332, filed on Feb. 12, 2001, which is incorporated herein by reference in its entirety for all purposes.

FIELD OF THE INVENTION

This invention generally relates to communication systems, and more specifically to systems and methods for data transmission.

BACKGROUND

The general concept of a network manager is well known and is implemented in some network industry applicable standards. Some of the advantages of a managed network are that the nodes can make better use of the given channel resources; there is better support of applications requiring quality of service (QoS) such as voice, video, audio; and there is support of low-power consumption and/or low-MIPS applications.

In some standards (for example, DOCSIS1.1, IEEE1394, IEEE802.11, incorporated herein by reference), isochronous operation is obtained by dividing the time axis into multi-frames, and using a network manager. The manager can be selected in various ways. A manager in this context is a station on the network that has the authority to distribute channel resources and determine which station currently has the right to transmit. The multi-frame (of constant or variable length) is divided into two periods: A contention free period (CFP); and a contention period (CP).

Nodes that support a managed network, sometimes referred to as point coordination function (PCF) capable, are given channel resources (that is, time periods) within the CFP. These nodes may transmit also in the CP, mostly using it for short management or data packets (for example, request for channel resources within the CFP). Variations on this method exist (for example, short CP's within the CFP).

Other standards, such as Ethernet IEEE Std 802.3 and HomePNA2.0, incorporated herein by reference, do not support managed networks. Instead they use contention-based techniques. Options for controlling media access on the contention based network may include CSMA/CD (Carrier Sense, Multiple Access, With Collision Detection) or CSMA/CA (Carrier Sense, Multiple Access, With Collision Avoidance). Generally, stations with a packet ready for transmission sense the line and transmit only when the media is free. If two stations collide, an algorithm exists to resolve the collision.

SUMMARY

A system is disclosed for implementing a managed network so that it can still support contention based operation. Contention based operation may result from older devices in the network that do not support the managed network capability. One application is for using a managed network for the future HPNA3.0 home network over phone-wire specification. Ways are disclosed for implementing a managed network in a hybrid network environment comprising HPNA3.0 nodes that support managed network capability together with HPNA1.0 and/or HPNA2.0 nodes that do not support managed network capabilities.

The invention addresses the problem of designing a managed network that can work efficiently in an environment where some nodes exist that are not PCF-capable. This is useful for implementing next generation proposals for standards into systems that were originally designed as contention based only.

The method of the invention utilizes isochronous operation, as described, wherein only the PCF-capable nodes are permitted to the use the CFP. The PCF-capable nodes may also use the CF, but the non-PCF-capable nodes are prevented from using the CFP which might cause collisions and drastically degrade performance. The non-PCF-capable nodes gain access to the media using the CP.

Three embodiments are described for preventing the non-PCF-capable nodes (such as the HPNA2.0 nodes in a hybrid HPNA2.0/3.0 environment) from transmitting within the CFP. The approach of the first two embodiments is to cause the non-PCF-capable nodes treat the CFP interval as one long packet, and thus make them defer transmission until the entire CFP interval packet ends. The approach of the third embodiment is to cause the non-PCF-capable stations to treat the CFP interval as a long collision resolve process, and thus make them defer transmission until the collision is resolved.

A system is disclosed for implementing a managed network so that it can still support contention based operation. Contention based operation may result from older devices in the network that do not support the managed network capability. One application is for using a managed network for the future HPNA3.0 home network over phone-wire specification. Ways are disclosed for implementing a managed network in a hybrid network environment comprising HPNA3.0 nodes that support managed network capability together with HPNA1.0 and/or HPNA2.0 nodes that do not support managed network capabilities.

DETAILED DESCRIPTION

Figure 1:
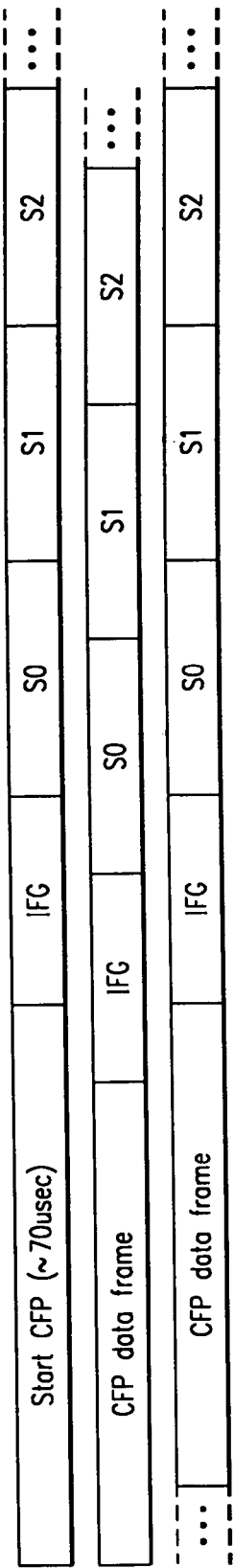
FIG. 1 shows an example of a CFP format employed in a hybrid HPNA2.0/3.0 system environment.

In most contention-based systems, there is a gap of silence (inter-frame gap or IFG) with a pre-defined duration between two consecutive bursts. In a first embodiment of the invention, PCF-capable stations that support managed network capabilities are given a shorter inter-frame gap during the CFP interval. This approach is usable where old or legacy stations monitor the channel after detecting burst end, and do not burst in if an early carrier sense is detected. In such case, the old stations will sense transmission sooner than expected because of the shortened gaps and will not have a chance to burst in. The PCF-capable stations always transmit a packet in their turn to prevent old stations from gaining control of the media within the CFP. The network manager determines which node can transmit, and will make sure that this condition is obeyed. Within the CP, the original IFG is used, so that non-PCF-capable nodes have a fair chance of transmitting their packets.

Other approaches, below, are employed where the condition that old stations monitor the channel after detecting burst end, and do not burst in if an early carrier sense was detected, may not always hold. This may be the case for some HPNA2.0 implementations (esp. for the case of priority 7 packets).

In a second embodiment, an overlap section between two consecutive bursts is created during the CFP interval, such that no silent period appears to the non-PCF-capable stations. This approach applies to implementations that decide on end of frame according to energy-detection. For this purpose, some arbitrary transmission (non-informative) is added at the start and at the end of each packet. The arbitrary transmission is not decoded by the receiver. For this approach, steps are taken to ensure that the energy-detectors do not sense energy-drop at the transition time between frames. This can be done in various ways such as, for example, by slowly lowering the transmitted power at the end of the packet to ensure that the beginning of the overlapping next packet is not much lower in power that the end of the current packet. To deal with implementations that base the end of frame decision on a known symbol sequence (e.g., EOF in HPNA2.0), it can be assured that these symbols will not appear at the end of the overlapping packets.

In some standards, in case of collision between two stations or more, all the other stations wait (defer) until the collision is resolved. For such situations, a third embodiment utilizes a network manager that transmits a unique frame with two main properties: 1) To the old non-PCF-capable stations, it appears as a collision frame; and 2) to the PCF-capable stations it will be a sign that the CFP interval has started (and it can also include relevant information such as the transmission grants). Starting at this point, all traffic on the network should appear to old stations as a collision resolve process. This is ensured by the network manager. By the end of the CFP, a special frame is sent to signal old stations that the (fake) collision resolve process is over.

As an example, consider the case of a HPNA3.0 transmission in a hybrid HPNA2.0/3.0 environment. In the HPNA2.0 standard, there are 8 priorities (priority 0 through 7, where 7 is the highest) and, in case of a collision, other stations wait until the collision is resolved unless they have a higher priority than the colliding stations. In accordance with one implementation of the invention, at the beginning of the CFP, the network manager (or some other node) sends a packet with priority 7. The length of this packet is less than 92.5 usec and more than 36 usec, such that HPNA2.0 nodes interpret this packet as a collision in priority 7. (Assume that no actual collision has occurred—i.e., that none of the HPNA2.0 nodes tries to transmit a priority 7 packet at the same time.)

From this point and through the whole CFP, a structure is maintained that makes the old stations believe that the collision is not resolved. One possible format is given in FIG. 1.

To prevent HPNA2.0 nodes from transmitting, two constraints exist: First, at least one of the intervals S0, S1, S2 always contains a 10 usec back-off signal, or else the HPNA2.0 nodes will assume that the collision is resolved, and may start transmitting. Second, there is some silence period at the beginning of the IFG to persuade the old HPNA2.0 nodes that this was actually a collision frame.

Extensions to the format given in FIG. 1 may include: Adding data frames within the S0/S1/S2 slots, as long as at least one is interpreted as a back-off signal by the HPNA2.0 nodes. Transmitting more than one back-off signal, thus causing the HPNA2.0 nodes to increase their counter (i.e. interpret that there is a collision between two or more nodes), and thus give a chance to transmit a "valid CS frame" (i.e. data frame longer than 92.5 uSec) without admitting the HPNA2.0 nodes to access the channel. And, adding data frames within the IFG as long as the second constraint, above, still holds.

Figure 2:
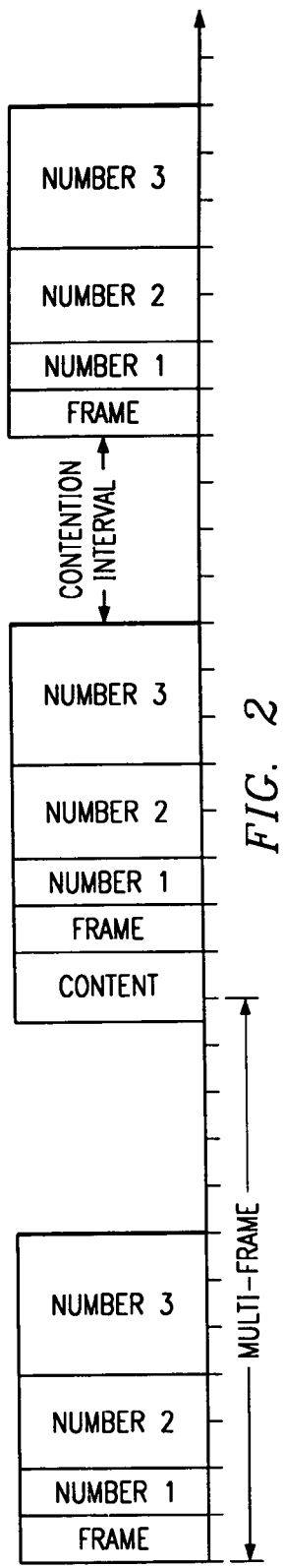
FIG. 2 shows an example of altering the multi-frame format, due to implementation of a long packet within the CP.
Figure 3:
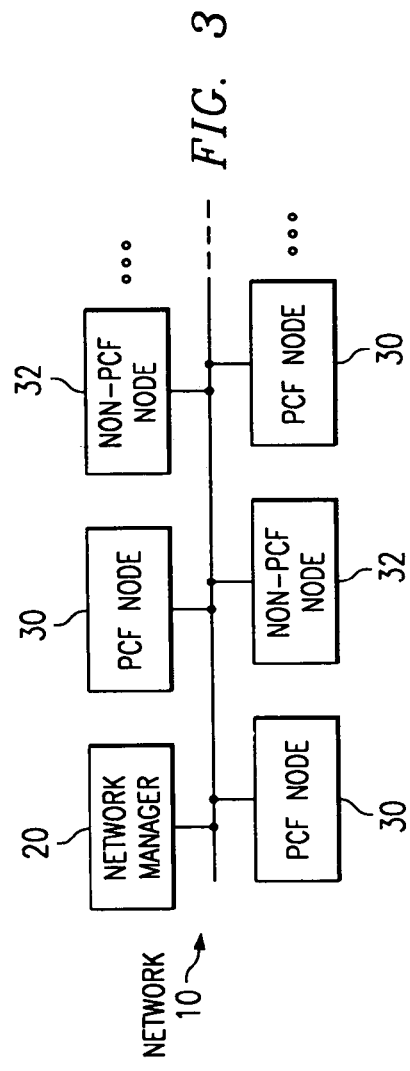
FIG. 3 shows a simplified block diagram of an embodiment of a hybrid network.

Since in a hybrid network, long packets may appear (e.g. up to 3 msec long HPNA2.0 packets may appear within the CP), it is suggested that a flexible multi-frame format be used. Consider the example of the hybrid HPNA2.0/3.0 environment. By flexible is meant that the periodical beginning of the multi-frame may be altered due to a long HPNA2.0 packet appearing at the end of the CP of the current multi-frame. The next multi-frame will be shortened to re-synchronize the multi-frame periodicity. This is described in FIG. 2.

Another option to combat the long packet of non-PCF-capable nodes, in order to maintain multi-frame format and synchronization may be the following. Each CP can be divided into two regions: CP_all followed by CP_PCFonly. In the first regions, all nodes: new PCF-capable in contention mode and old non-PCF-capable nodes can transmit their packets (in the example of hybrid HPNA2.0/3.0 environment, HPNA3.0 and HPNA2.0 nodes are meant respectively). The second region will be restricted to PCF-capable nodes only that are aware of the length of this period and will not cause a delay in the beginning of the next multi-frame. It is for the network manager to assure that no non-PCF-capable node will transmit in this period. This can be done in manners similar to the ones discussed above. In this case, a long packet, transmitted by a non-PCF-capable node in the first period of the CP, might cause a delay in the beginning of the CP_PCFonly region, or override it entirely, or even cause a slight delay in the beginning of the next multi-frame, depending on the pre-defined length of the CP_PCFonly region. Still the effect of such a packet may be controlled, by pre-determining the length of each region within the CP.

An example of using a method based on such modifications is given below. It deals with implementing a managed network supporting QoS in a better way, in a network consisting of at least two managed-network supportive ("enhanced") devices and at least one non-enhanced legacy HPNA2.0 device.

In that case several requirements exist:

Create contention free periods (CFP) to be used without contention only by the enhanced devices. Transmission during the CFP is based on the manager of the network, and supports QoS applications.

Allow legacy devices (as well as possibly other devices) to use the medium in contention period (CP).

Generate an access mechanism for the enhanced devices to request channel resources (possibly including parameters of the required resources).

In order to prevent the legacy devices from transmitting during the CFP, it is possible to disguise the whole CFP so it is interpreted by the carrier sense (CS) mechanism of the legacy HPNA2.0 devices as one long HPNA2.0 packet.

For that one option may be to start the CFP with a priority 7 packet transmitted by the manager. In case of a collision between this packet and a packet transmitted by a non-enhanced device, the manager always draws the lowest signal slot so it will never loose in the collision resolve process. This ensures that even in the worst case, the manager packet ("CFP_START") is transmitted with minimal delay. This packet may be used to declare the beginning of the CFP, including some other information such as length of CFP, polling messages for other enhanced devices, etc. The polling information within this packet can include relevant data such as packet lengths, modulation parameters to be used in the packets, and so on.

Following the manager packet, all packets within the CFP, appear on the medium separated by a short enough IFG (CFP_IFG), and all using priority 7, so legacy devices interpret a series of such packets as one long packet. These packets may be transmitted either by the manager (e.g. other polling messages), or by any other enhanced device (e.g. data packets). It seems that if the CFP_IFG is of the order of 5 usec, the CS mechanism of legacy HPNA2.0 devices will not go down and no legacy device will gain access to the line during the CFP. Notice that some limitations on the length of the CFP may exist, based on the maximum allowable packet length of HPNA2.0, which may cause the CS mechanism of the legacy devices to go down (and indicate that the medium is idle), based on a "time-out" signal. A second consideration might follow the possibility that consecutive packets within the CFP might be detected by a certain device with a significant power variation (based on the attenuation from source to the listening device, which might go as high as 36 dB in some extreme cases). In this case it might be desired to deal with this by varying the transmitted power, or lowering the power gradually at the end of each packet or any other mechanism to prevent the CS mechanism of legacy devices to sense that the medium is idle when a low-power packet follows a high-power one.

The above solution prevents legacy devices from accessing the medium during the CFP. Other methods that may be used to assure this include using actual packet concatenation (as proposed in the second proposal, above), or using a signal transmitted by a certain device (e.g. the manager) during the whole CFP, independent of the actual data-packets. (Notice that when all legacy devices use packets with priority lower than 7, a CFP may be created in a much simpler way. In that case using priority 7 by all enhanced devices will ensure that no lower priority packet (i.e. no legacy device packet) will gain access to the medium).

The enhanced devices need to interpret the polling messages of the manager and gain access to the medium accordingly, using the CFP_IFG to prevent other non-enhanced devices to sense an end of the packet and to try and gain access. This might require the enhanced devices to use a new access mechanism other than the currently implemented CS mechanism, during the CFP.

Outside of the CFP, within CP, the standard CSMA/CD mechanism can be used, to allow all devices legacy as well as enhanced to access the medium. CFP's can occur periodically quasi-periodically or non-periodically. Notice that some delay in the beginning of a CFP may occur due to the medium being busy (because of a transmission of a packet from a legacy device, which began within the CP and "slipped" to the CFP range). This can cause the beginning of the CFP to slip, which should be taken into account. Enhanced devices using the CP may be designed to end their transmission by the time the CFP is to begin.

A final consideration deals with the method in which the enhanced devices request for CFP channel resources (reservation requests, RR), from the manager. This can be done either within the CP using some CSMA/CD mechanism, or it can be done within the CFP. If done within the CFP it is important to assure that during the periods in which RR's are transmitted by enhanced devices, the medium is seen as occupied by all other legacy devices. This can be done for example by methods described above.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for managing data communication on a network coupled to first nodes and second nodes comprising:

controlling a first time period for one or more first data transmissions on the network, wherein each of the first data transmissions have a beginning, an end and a transmitted power level, and wherein the first nodes are permitted to transmit data during the first time periods and the second nodes are not permitted to transmit data during the first time period by causing the second nodes to treat the first time period as a single transmission period;

controlling the transmitted power level at the end of each of the first data transmissions so that the variation between the transmitted power level at the end of each of the first data transmissions and the beginning of each of the next of the first data transmissions is such that the second nodes do not sense an energy drop between the first data transmissions.

2. The method of claim 1, wherein the single transmission period appears to the second nodes as a transmission of a single packet of data.

3. The method of claim 1, wherein the single transmission period appears to the second nodes as a single collision resolve process.

4. The method of claim 1, further comprising controlling an inter-frame gap between the first data transmissions by the first nodes during the first time period such that the second nodes treat the first time period as a single transmission period.

5. The method of claim 1, further comprising controlling a second time period for one or more consecutive second data transmissions on the network wherein the first nodes and the second nodes are permitted to transmit data during the second time period.

6. The method of claim 5 further comprising supporting contention based operation during the second time period.

7. A method for managing data communication on a network coupled to first nodes and second nodes comprising:

controlling a first time period for one or more first data transmissions on the network wherein the first nodes are permitted to transmit data during the first time periods and the second nodes are not permitted to transmit data during the first time period by causing the second nodes to treat the first time period as a single transmission period; wherein each of the first data transmissions have a beginning, an end and a transmitted power level;

and controlling the transmitted power level at the end of each of the first data transmissions such that the variation between the transmitted power level at the end of each of the first data transmissions and the beginning of each of the next of the first data transmissions is such that the second nodes do not sense an energy drop between the first data transmissions.

8. The method of claim 7, further comprising:

controlling the first data transmissions during the first time periods by the first nodes such that the first data transmissions overlap.

* * * * *